United States Patent [19]

Bennett et al.

[11] 4,242,917
[45] Jan. 6, 1981

[54] ISOLATION FLEXURE FOR GYROSCOPES

[75] Inventors: Virgil O. Bennett; George W. Wilson, both of Phoenix, Ark.

[73] Assignee: Sperry Corporation, New York, N.Y.

[21] Appl. No.: 921,301

[22] Filed: Jul. 3, 1978

[51] Int. Cl.$^2$ ............................................. C01C 19/16
[52] U.S. Cl. ......................................... 74/5.5; 74/5 F
[58] Field of Search .................... 74/5 F; 29/445, 558; 308/2 A; 260/167

[56] References Cited

U.S. PATENT DOCUMENTS

| | | | |
|---|---|---|---|
| 2,858,126 | 10/1958 | Gomez | 308/2 A X |
| 2,909,064 | 10/1959 | Schoeppel et al. | 74/5 F |
| 2,932,482 | 4/1960 | Dickie | 267/160 X |
| 3,165,945 | 1/1965 | Magrum | 74/5 F X |
| 3,176,523 | 4/1965 | Amlie et al. | 74/5 F X |
| 3,264,880 | 8/1966 | Fischel | 74/5 F |
| 3,290,949 | 12/1966 | Samet | 74/5 F |
| 3,483,760 | 12/1969 | Hurlburt | 74/5 F |
| 3,576,133 | 4/1971 | Krupick | 74/5 F |
| 3,742,769 | 7/1973 | Crutcher et al. | 74/5 R |
| 3,844,663 | 10/1974 | Prette | 308/2 A X |
| 3,974,701 | 8/1976 | Erdley | 74/5 F X |
| 4,042,051 | 8/1977 | Ricciardi | 308/2 A X |

FOREIGN PATENT DOCUMENTS 1401303  4/1965  France ................................. 267/160

Primary Examiner—Rodney H. Bonck
Attorney, Agent, or Firm—Howard P. Terry

[57] ABSTRACT

An illustrative embodiment of the invention provides an isolation flexure assembly for the control moment gyroscope of a spacecraft attitude control system for attenuation of vibratory disturbances therein, due to rotor static and dynamic unbalance and spin bearing radial forces. The isolation flexure assembly isolates the rotor, the main generator of the vibratory disturbances, from the spacecraft permitting ultraprecise pointing or precision torquing of the spacecraft.

4 Claims, 9 Drawing Figures

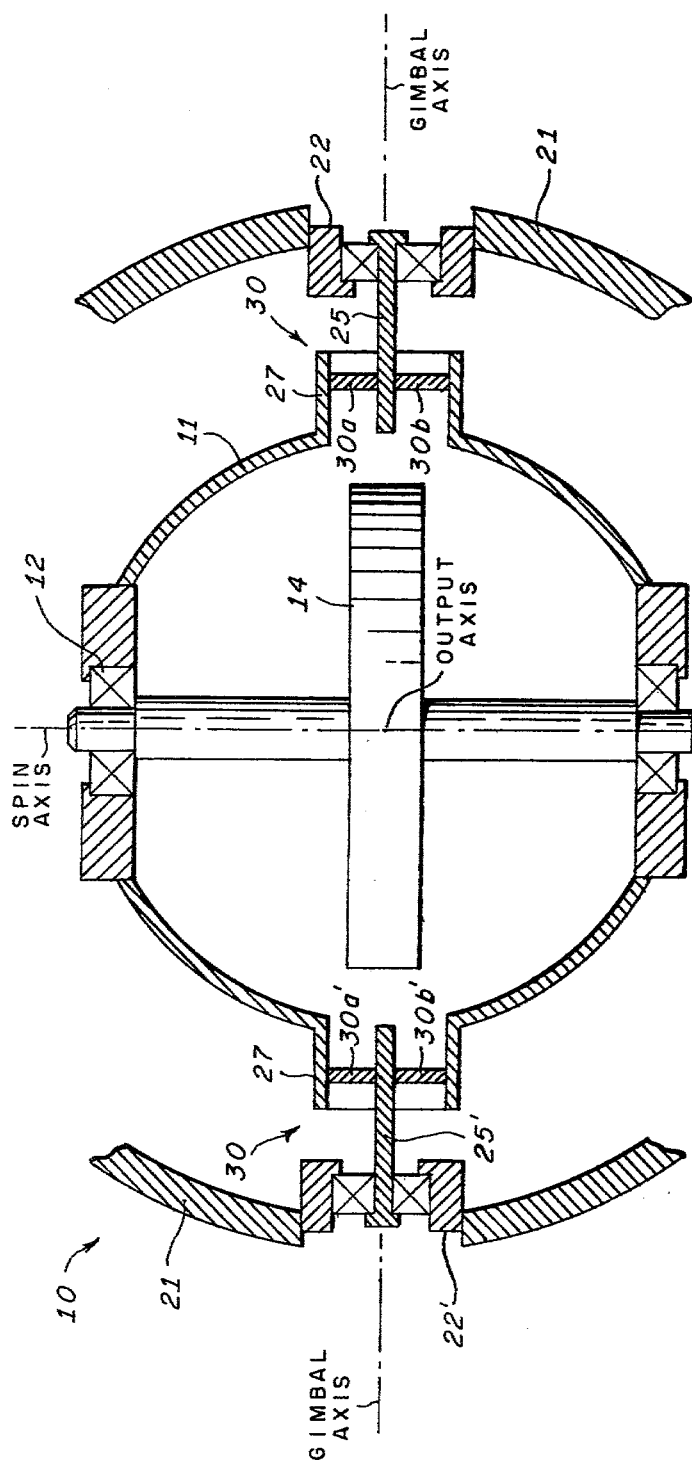

ISOLATION FLEXURE FOR GYROSCOPES

BACKGROUND OF THE INVENTION

1. Field of the Invention

The invention relates to a control moment gyroscope and, more specifically, to a control moment gyroscope integral isolator which attenuates induced disturbance vibrations therein due to rotor static and dynamic unbalance and spin bearing anomalies.

2. Description of the Prior Art

The gyroscopic control apparatus generally referred to as a control moment gyroscope or CMG functions as the actuator or torquing element in an attitude control system of spacecraft and orbiting vehicles. The CMG includes an outer gimbal ring fixedly attached to the spacecraft and which includes a gimbal torque motor. The gimbal torque motor creates a torque about the gimbal axis which causes the CMG's gimbal to rotate about an axis perpendicular to the rotor spin axis. The rotation of the gimbal, moreover, creates a gyroscopic torque that is applied to the spacecraft structure for attitude control of the spacecraft.

In a vehicle having an ultra-precise pointing capability requirement, such as in a space telescope where precision pointing is mandatory and where vibration from any source will have a profound effect on the quality of the output image thereof, vibratory disturbances originating in the control moment gyroscope are of significant concern. That is, it is necessary to reduce the CMG's induced disturbance vibrations, because of their adverse effects upon spacecraft payload operation, to a very low level in order to satisfy some spacecraft and/or satellite attitude control system's pointing accuracy requirements. In the past, and as described in Applicant's assignees U.S. Pat. No. 3,918,778, significant progress has been made in the reduction of the principle vibration forcing functions, rotor and spin bearing unbalance forces. However, the present state of the art of rotor balance techniques and spin bearing design has not been able to reduce the disturbance vibrations to the levels required to meet the induced vibration requirements of an ultra-precise pointing spacecraft.

Accordingly, if an economical, generally vibrationless spacecraft, capable of ultra-precise pointing is to be developed, and as it is impractical to further reduce the vibratory forcing functions mentioned above, it is necessary to attenuate or isolate the disturbances transmitted from the gyroscopic rotor to the spacecraft. That is, some form of spring/damper must isolate the vibration generating elements from the spacecraft. Moreover, a control moment gyroscope attenuation or isolation system must be structurally sound and rigid along the spin axis and about the gimbal axis, and also satisfy the constraint that the torsional stiffness about the gyroscopic output axis remains high in order that an apparent increase in the CMG gimbal inertia, which would decrease the CMG's performance capability or increase the size of the CMG's gimbal torquer to maintain the same performance, is precluded.

SUMMARY OF THE INVENTION

In accordance with the invention, the difficulties with respect to the vibratory disturbances emitted by an operating control moment gyroscope are to a great extent alleviated through the practice of this invention.

Specifically, a gyroscopic device such as a control moment gyroscope according to this invention includes a gimbal assembly with a spinning rotor, a torquer module assembly coupled to the gimbal assembly for applying a torque thereto and rotating it, and a base ring fixedly coupled to a spacecraft to contain the gimbal assembly-torquer module assembly and to transmit the torque generated by the CMG to the spacecraft. The CMG further includes an isolation flexure means disposed between the spacecraft and the rotor and, more specifically, between the torquer assembly and the gimbal assembly and perpendicular to the gimbal axis. The isolation flexure means or isolator assembly attenuates vibratory disturbances emitted by the gyroscopic rotor to the spacecraft. The isolation flexure means includes rods coupled to the gimbal assembly and the torquer module assembly, and the gimbal assembly and a sensor module assembly oppositely disposed from the torquer module assembly along the gimbal axis. The isolation flexure means, moreover, are disposed in a plane perpendicular to the gimbal axis and are of sufficient stiffness such that the torsional stiffness about the gyroscopic output axis remains high whereas isolation or low stiffness is provided along the gimbal axis and along the output axis for attenuation of the disturbance vibrations.

More specifically, in the preferred embodiment of this invention, the isolation flexure means of this invention, coupled to the torquer and sensor trunnions, includes a plurality of flexure assemblies composed of a cluster or bundle of relatively fine flexure rods coupled at each end to support hubs, which are coupled at one end to the gimbal assembly (housing ring), and at the other end to the respective torquer and sensor assembly trunnions.

The various features of novelty which characterize the invention are pointed out with particularity in the claims annexed to and forming a part of this specification. For a better understanding of the invention, operating advantages and specific objects attained by its use, reference should be had to the accompanying drawings and descriptive matter in which there is illustrated and described a preferred embodiment of the invention.

BRIEF DESCRIPTION OF THE DRAWINGS

FIG. 2a is a schematic illustration of the gyroscopic device of this invention in section through the spin axis and gimbal trunnion axis, and FIGS. 2b and 2c are useful in explaining the invention.

DESCRIPTION OF THE PREFERRED EMBODIMENT

Figure 1:
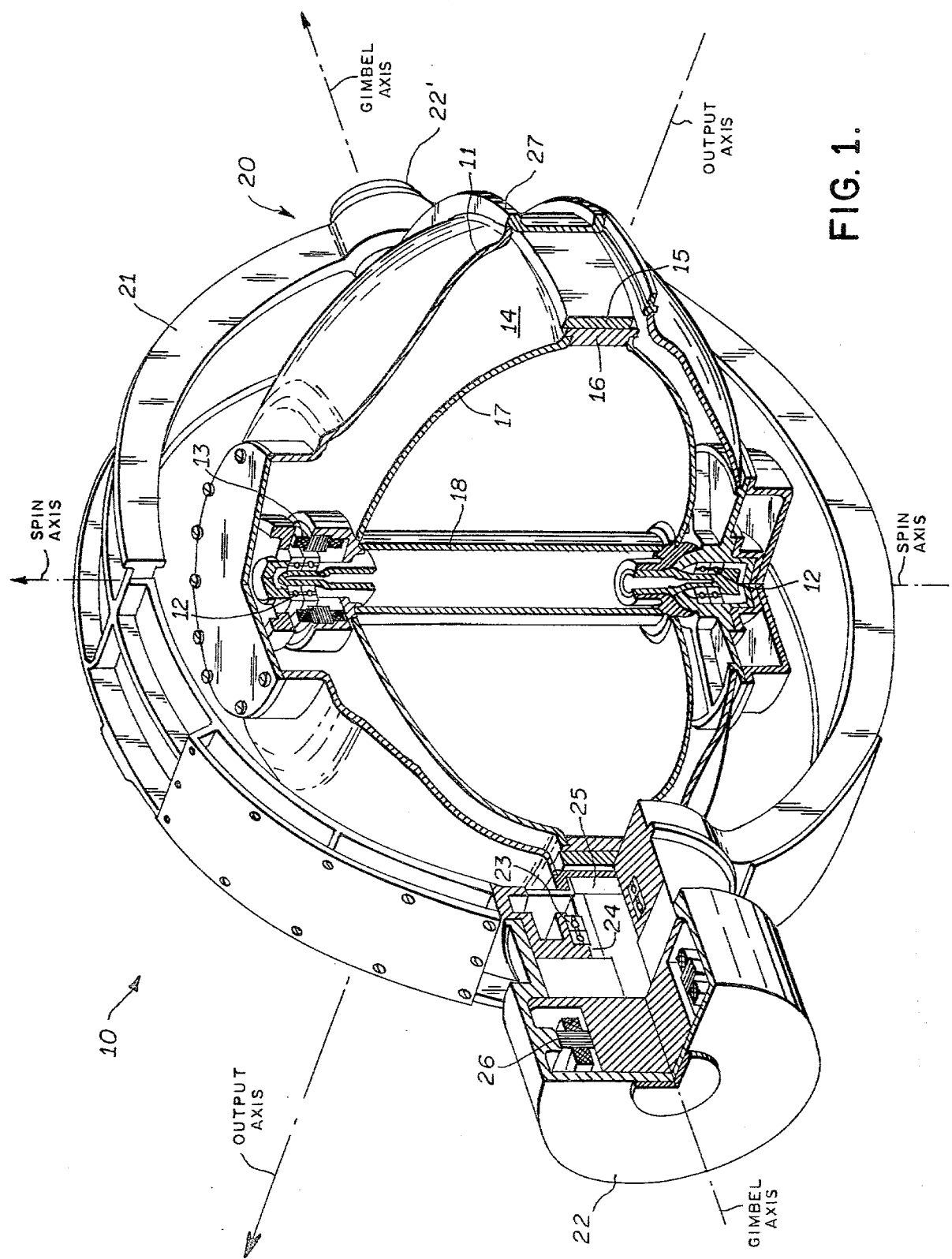
FIG. 1 is a perspective view in partial section of a control moment gyroscope that embodies principles of the invention.

For a more complete appreciation of the invention, attention is invited to the following description of an illustrative embodiment of the invention. Referring to FIG. 1, there is shown a gyroscopic device and, more specifically, a single degree-of-freedom control moment gyroscope CMG 10 which provides the required torque and momentum exchange for attitude control of an unmanned space vehicle (not shown). The CMG 10 may be of the configuration described in Applicant's assignee's U.S. Pat. No. 3,742,769, but it will be understood that the benefits obtained by the instant invention are not limited to this specific configuration. The gyroscope 10 includes a rotor housing 11, rotor support bearings 12, a rotor drive motor 13 and a rotor 14, journalled in bearings 12 for spinning about a spin axis, all enclosed by the housing 11. Because the gyroscope 10 shown is specifically used for the control of spacecraft, the housing 11 not only supports the rotor 14 but also must be able to withstand precession torques, external pressure (as the rotor operates in an evacuated housing 11), environmental shock and vibration. The rotor 14, moreover, of the gyroscope 10 shown is of a bi-metal design having an outer massive rim 15 supported by an inner lightweight rim 16 and a lightweight generally spherical web 17 and central shaft assembly 18.

A control moment gyroscope 10 further includes at least one gimbal assembly 20 having a gimbal axis perpendicular to the spin axis, wherein the rotor housing 11 is rotatable about the gimbal axis. The gimbal assembly 20 includes an outer ring portion or base ring 21 coupled to outer modules 22, 22' oppositely disposed from each other along the gimbal axis. The outer modules 22, 22' (only one being shown in section in the drawing) are rotatably coupled via bearings 23 to an inner shaft 24. The inner shaft 24 is directly coupled via a trunnion 25 to the housing 11 or, more specifically, to the gimbal assembly housing ring 27 for rotation of the housing 11 about the gimbal axis. The gimbal assembly 20 of a control moment gyroscope further includes a torquer motor 26 housed within one of the outer modules 22 or torquer module and a sensor (not shown) housed within the opposite module sensor module 22'. The torquer motor produces a torque and angular acceleration upon the gimbal assembly 20 in a direction about the gimbal axis for attitude control of the spacecraft (not shown) to which the base ring 21 is attached. Accordingly, for a spacecraft having a control moment gyroscope 10, attached via the base ring 21 to the spacecraft's structure, the torque applied by the torquer motor 26 in response to a control signal from control means (not shown) creates a gyroscopic torque about the control moment gyroscope's output axis due to the inherent rigidity of the gyroscope that is applied to the spacecraft structure and which rotates the spacecraft for attitude control.

Referring now to FIG. 2a, the control moment gyroscope 10 of FIG. 1, is schematically shown, in section through the spin axis and gimbal trunnion axis, having schematically illustrated isolation flexure means 30 of this invention disposed between the gimbal assembly housing ring 27 and the torquer module 22 trunnion 25 and the sensor module 22' trunnion 25'. That is, the isolation flexure assembly of the invention is disposed between the rotor 14 and spin bearings 12, from which the sinusoidal forcing functions or vibratory disturbances emanate, and the spacecraft as represented by the base ring 21 and supports the inner gimbal assembly including housing 11 and rotor 14. As shown therein, the isolation flexure means 30 include isolation flexure bar means 30a and 30b and 30a' and 30b' coupled to respective trunnions 25 and 25'. The isolation flexure bar means or isolation bars are disposed perpendicular to the gimbal and output axes and parallel to the spin axis. As more clearly illustrated in the schematic of FIGS. 2b and 2c, the isolation flexure means 30 of this invention has a desired, preset or predetermined low stiffness along the gimbal and output axes and a desired preset or predetermined high stiffness along the spin axis and about the gimbal and output axes. Accordingly, the isolation flexure means 30 attenuates the vibratory disturbances along the gimbal and output axes, that is, in the plane of the rotor 14; whereas, the isolation flexure means 30 insures that the torsional stiffness about the output axis remains high.

Figure 3:
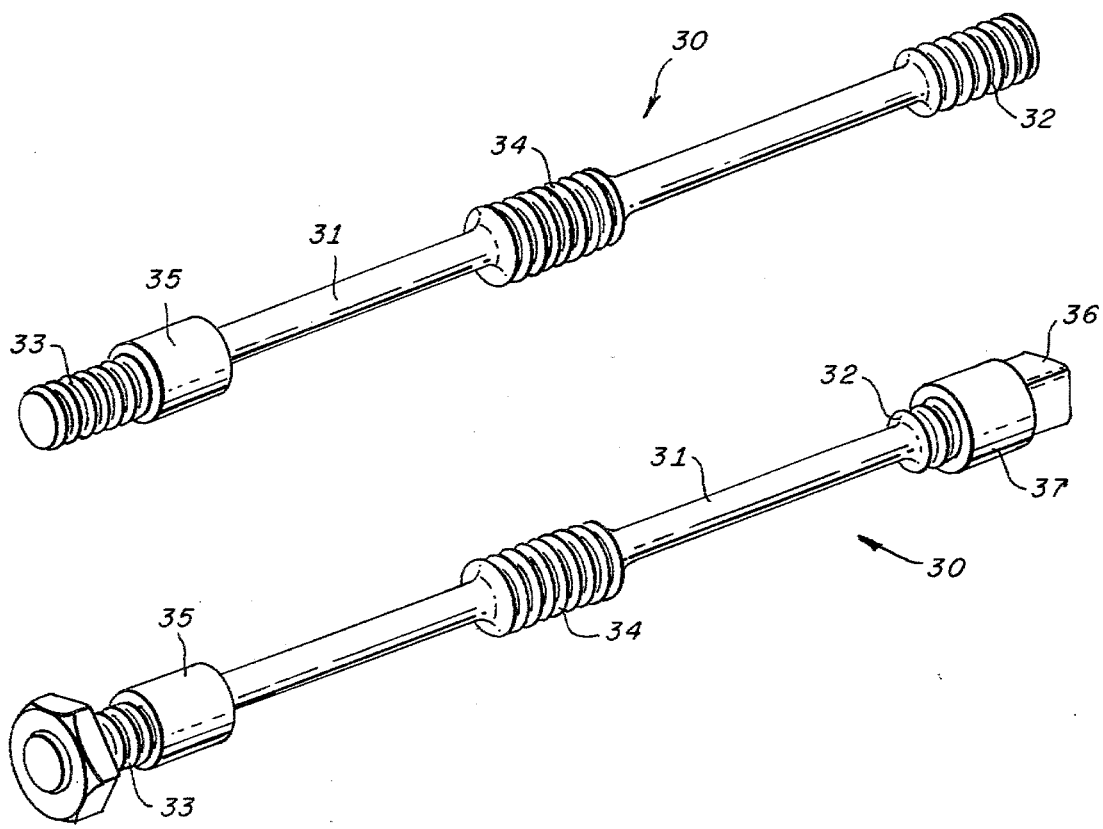
FIG. 3 illustrates one form of an isolation flexure rod of this invention.

An embodiment of the isolation flexure rod of this invention is shown in FIG. 3 as a steel bar 31 particularly made from a high strength nickel alloy steel because of the high stress levels to be imposed upon the isolation flexure means 30 during operation of this invention with the control moment gyroscope 10. The isolation bar 31 of FIG. 3 is one form of isolation flexure means 30 adapted for retrofit to an existing CMG. As illustrated, the isolation flexure bars or rods 31 of FIG. 3 are of circular cross-section having threaded end portions 32 and 33 and a threaded center section 34. The threaded end portions 32, 33 and center section 34 provide the interface between the isolation flexure rod 31, the housing ring 27 and the gimbal axis trunnions 25 and 25' as shown in FIGS. 2a and more specifically in FIG. 5. That is, the threaded center section couples to a correspondingly threaded portion of the trunnion 25 and the threaded end portions 32 and 33 extend into and protrude through openings 29 (FIG. 5) formed in respective flange portions of the housing ring 27. The isolation flexure bars 31 are coupled to the ring 23 by retaining nuts screwed onto the threaded end portions. The isolation bars 31 shown in FIG. 3 are designed to meet existing hardware and are formed with one end portion 33 having a cylindrical portion or pilot 35 of increased diameter which serves as an accurate guide for positioning the isolator flexure bar 31 within the hole 29 formed in the housing ring 27. Moreover, the opposite end portion 32 is bolted to its respective flange portion of the housing ring 23 by means of the special nut 36 shown in FIG. 3 having a pilot portion 37 for accurately locating and positioning its respective end portion of isolator flexure bar 31 within the base ring 27.

Figure 4:
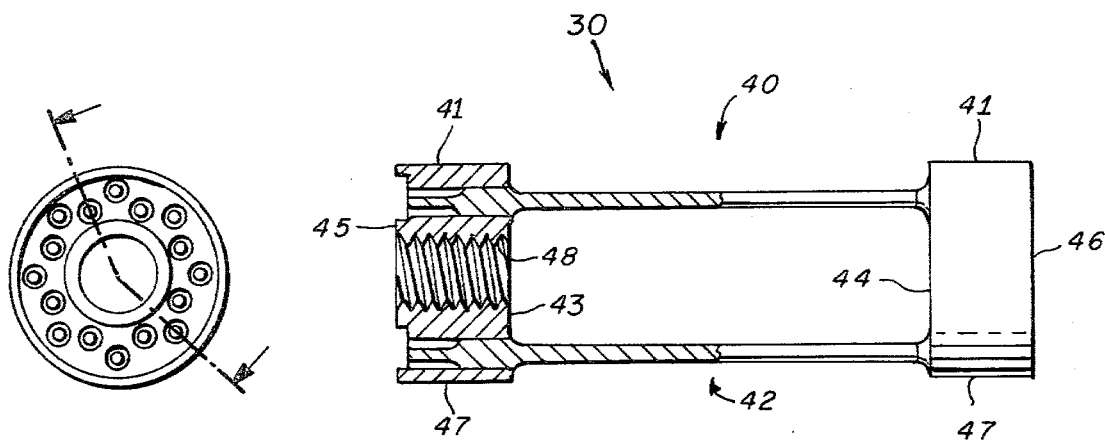
FIG. 4 illustrates a preferred embodiment of an isolation flexure rod of this invention.
Figure 5:
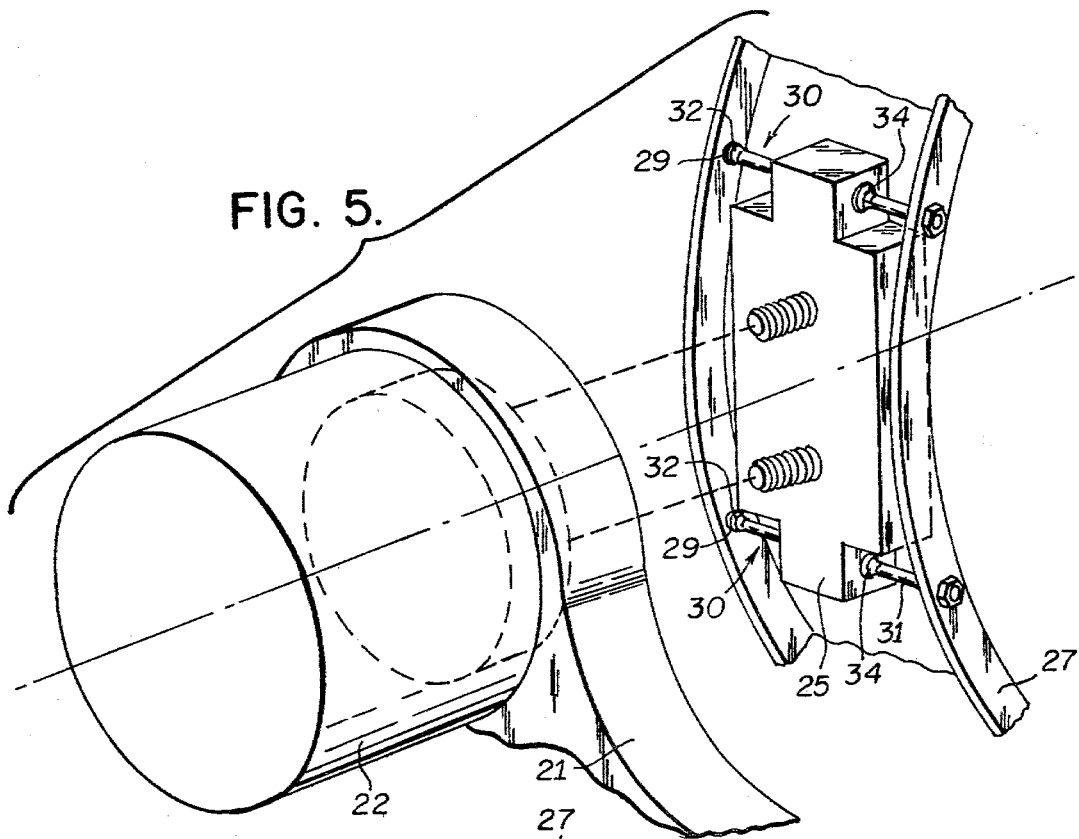
FIG. 5 is a fragmentary partially exploded perspective view of the isolation flexure of FIG. 3 at the torquer module trunnion.

Although the isolation flexure means 30 have been described in terms of the isolation bars 31 (FIG. 3) which were designed to fit and maintain compatibility with existing hardware of a control moment gyroscope 10 with minor modifications thereto, it is to be understood that modification of the isolation bar 31 may be made without departing from the scope of this invention. Accordingly, a preferred embodiment of the isolation flexure means 30 of this invention is shown as an isolation flexure assembly 40 in FIG. 4. The isolation flexure assembly 40 comprises a pair of cylindrically shaped annular end portions or support hubs 41 interconnected by a cluster or bundle of relatively fine flexure rods 42 which are heliarc welded to the support hubs 41. In this embodiment of the invention, the support hubs 41 are cylindrical annular discs having flat inner face portions 43, 44 and outer face portions 45, 46, respectively, wherein the annular discs lie in disposed parallel planes and are coaxial with each other. The cylindrical outer walls 47 of the support hubs 41 forms a pilot for accurately aligning the isolator flexure assembly 40 in the trunnion 25 and the base ring 27. The inner wall of both annular discs 41 are threaded for receiving a bolt therein for attachment to the housing ring and the trunnion. It is noted that the preferred embodiment of the isolator flexure assembly 40 of FIG. 4 represents only one of the four isolator means shown in FIG. 2, or one half of the isolator bar 31 of FIG. 3. That is, whereas two isolator bars 31 are shown in FIG. 5 for the torquer module trunnion 25, four isolator flexure assemblies 40 of the type shown in FIG. 4 are required to couple the trunnion 25 to the housing ring 23, see FIG. 6. Thus, at each module 22 or 22' two isolator flexure assemblies 40 are coupled to one flange of the housing ring 27 and the associated trunnion 25, and two isolator flexure assemblies 40 are coupled to the opposite flange of the housing ring and the trunnion, axially aligned with the opposite flexure assemblies.

Figure 6:
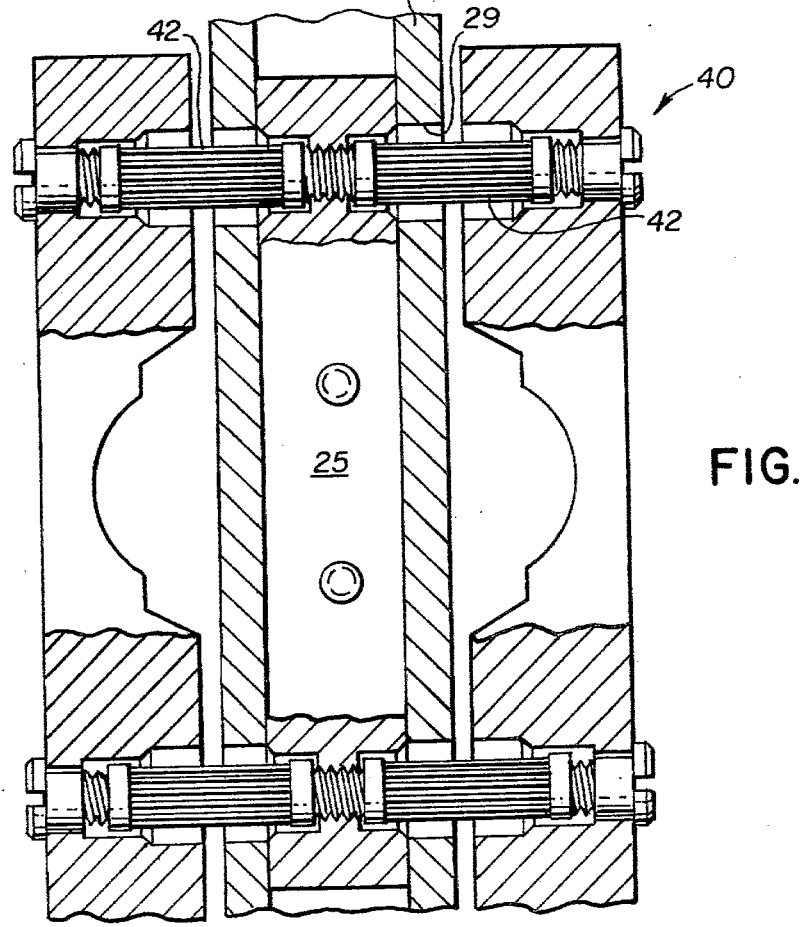
FIG. 6 is a fragmentary partially exploded perspective view of the isolation flexure of FIG. 4 at the torquer module trunnion.

It is noted that the axially aligned flexure assemblies 40 of FIGS. 4 and 6 may be each coupled to the trunnion 25 through a single threaded bolt connecting to both flexure assemblies 40 within the trunnion. In addition, the flexure assemblies 40 and associated mounting nuts are accurately machined for alignment and compression purposes.

Figure 7:
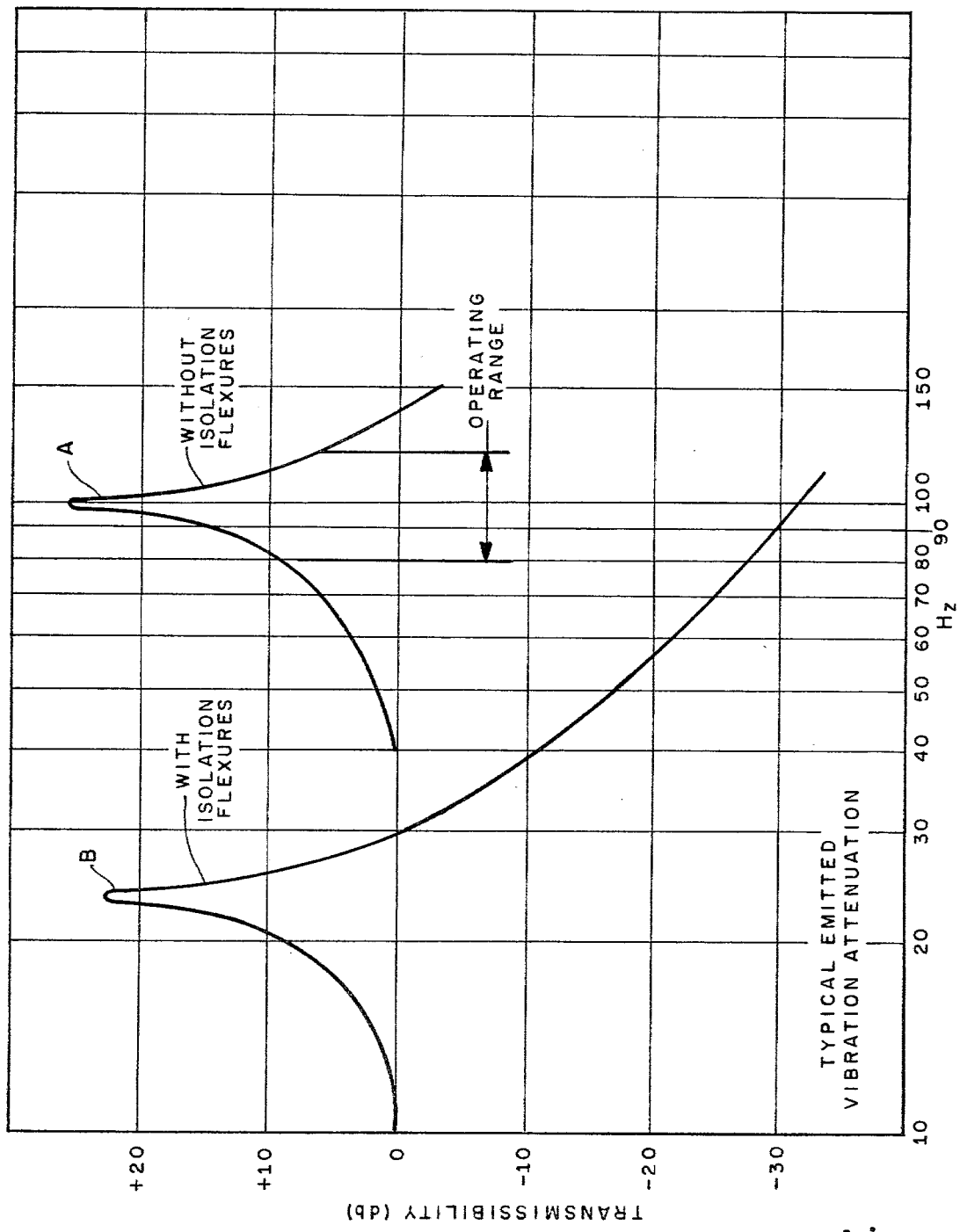
FIG. 7 is a graphical representation of the vibratory attenuation attained by this invention.

In operation, the control moment gyroscope 10 is fixedly attached to a spacecraft for attitude control thereof. During operation, the rotor 14 typically operates at a speed of 5,000-7,000 rpm or 80-120 cycles; moreover, the induced vibration disturbances or forcing functions which emanate from the rotor due to rotor unbalance and from the spin bearing due to bearing anomalies are lateral or occur in the plane of the rotor and are of the same 80-120 cycles as the operation of the rotor. Therefore, the vibratory disturbances substantially resonate at the operating frequency of the rotor 14 (see curve A in FIG. 7). The isolation flexure means 30 of this invention, however, acts as a spring/damper means between the vibratory rotor and the spacecraft for attenuation of the vibratory disturbances at the operating speed of the rotor, see curve B, FIG. 7. Specifically, the isolation flexure means 30 attenuates or isolates the spacecraft from vibratory disturbances along the gimbal and output axes, that is, it attenuates all disturbances in the plane of the rotor. However, along the spin axis and about the gimbal and output axes the cluster of steel bars 42 of the isolator assembly 40 or the isolation flexure bars 31, are rigid and, therefore, insure that the torsional stiffness about the CMG output axis remains high, so as not to cause an apparent increase in the CMG's gimbal inertia and thereby decrease the performance capability of the control moment gyroscope 10. In addition, it is noted that the isolation flexure means 30 and, more specifically, the pilot portions 35, 37 and 47 accommodate relative sliding motion between the isolator and the opening in the housing ring for compressive type forces, thereby precluding the possibility of buckling of the isolator.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A gyroscopic device including a rotor assembly adapted to spin about an axis, a gimbal assembly for rotatably mounting the rotor about an axis perpendicular to the spin axis and oppositely disposed and aligned module assemblies including bearing means for receiving the gimbal assembly for rotation wherein said device comprises:

isolation flexure means disposed between and coupled to the gimbal assembly and respective modules, said isolation flexure means being aligned in a plane perpendicular to the gimbal and rotor output axes and parallel to the spin axis, said isolation flexure means having a predetermined relative low stiffness in the plane of the gimbal and output axes and a predetermined relative high stiffness along the spin axis and about the gimbal and output axes, and whereby said isolation flexure means attenuates vibratory disturbances emitted by the rotor assembly to the module assemblies along the gimbal and output axes and insures torsional stiffness about the output axis.

2. A gyroscopic device according to claim 1 wherein said isolation flexure means comprises a steel alloy bar having threaded end portions and a threaded mid portion adapted to couple the bar to the gimbal assembly at each end portion and to the trunnion at the mid portion.

3. A gyroscopic device according to claim 4 wherein said bar includes a pilot portion axial to and juxtaposed to one of said threaded end portions for accurate assembly into the rotor assembly and to accommodate relative sliding motion.

4. A gyroscopic device according to claim 1 wherein the isolation flexure means comprises a plurality of longitudinally aligned rods in juxtaposed relation, having their end portions coupled to annular support hubs, the hubs being threaded for coupling to the trunnion and the gimbal assembly.

* * * * *